US009913169B2

(12) United States Patent
Forssell

(10) Patent No.: US 9,913,169 B2
(45) Date of Patent: Mar. 6, 2018

(54) DYNAMIC HOTSPOT ACCESS CONTROL

(75) Inventor: Mika Forssell, Porvoo (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 14/404,257

(22) PCT Filed: May 30, 2012

(86) PCT No.: PCT/EP2012/060114
§ 371 (c)(1),
(2), (4) Date: Nov. 26, 2014

(87) PCT Pub. No.: WO2013/178254
PCT Pub. Date: Dec. 5, 2013

(65) Prior Publication Data
US 2015/0189547 A1 Jul. 2, 2015

(51) Int. Cl.
H04W 28/08 (2009.01)
H04L 29/06 (2006.01)
H04W 12/08 (2009.01)
H04L 12/803 (2013.01)
H04W 48/06 (2009.01)
H04W 84/12 (2009.01)

(52) U.S. Cl.
CPC ........... *H04W 28/08* (2013.01); *H04L 47/122* (2013.01); *H04L 63/101* (2013.01); *H04W 12/08* (2013.01); *H04W 48/06* (2013.01); *H04W 84/12* (2013.01)

(58) Field of Classification Search
CPC ..... H04W 28/08; H04W 12/08; H04W 48/06; H04L 47/122; H04L 63/101
See application file for complete search history.

(56) References Cited

U.S. PATENT DOCUMENTS

2011/0314145 A1* 12/2011 Raleigh ............... H04L 41/0893
709/224
2012/0083270 A1 4/2012 Robbins et al.
2012/0113965 A1* 5/2012 Puthenpura ........... H04W 28/08
370/338
2015/0078359 A1* 3/2015 Scahill ................. H04W 48/16
370/338

(Continued)

FOREIGN PATENT DOCUMENTS

WO WO 2011/035197 A1 3/2011
WO WO 2011035197 A1 * 3/2011 ............ H04W 48/02
WO WO 2011/110108 A1 9/2011

OTHER PUBLICATIONS

International Search Report and Written Opinion dated Dec. 14, 2012 corresponding to International Patent Application No. PCT/EP2012/060114.

(Continued)

Primary Examiner — Chi H Pham
Assistant Examiner — Weibin Huang
(74) Attorney, Agent, or Firm — Squire Patton Boggs (US) LLP

(57) ABSTRACT

A method including modifying access rights for a Wi-Fi network in response to a condition, wherein modifying the access rights for the Wi-Fi network allows users without Wi-Fi subscriptions to access the Wi-Fi network. The method may further include returning the access rights back to their prior state when the condition is no longer met.

19 Claims, 4 Drawing Sheets

(56) References Cited

U.S. PATENT DOCUMENTS

2015/0173000 A1* 6/2015 Basilier ............... H04W 48/18
370/329

OTHER PUBLICATIONS

3GPP TS 23.402 V8.10.0 (Mar. 2012), Technical Specification, 3rd Generation Partnership Project; Technical Specification Group Services and System Aspects; Architecture Enhancements for non-3GPP Accesses (Release 8), Mar. 2012, 199 pages.
InterDigital Communications et al., "Use Case for Network Based Congestion Management and Flow Mobility Based on User Plane Congestion in the RAN," 3GPP Draft, S1-121058 Upcon Flow Mobility Ran Congestion CL, 3GPP TSG-SA WG1 #58, Seville, Spain, Apr. 30, 2012, 3 pages.

* cited by examiner

DYNAMIC HOTSPOT ACCESS CONTROL

BACKGROUND

Field

Embodiments of the invention relate to coordinating user access to networks, such as, but not limited to, mobile networks and Wi-Fi networks.

Description of the Related Art

Wi-Fi networks are becoming increasing necessary to provide mobile broadband services. Wi-Fi technology is already a standard feature on smart phones, tablets, and laptops. Major telecommunications operators are either already using Wi-Fi technology or planning to deploy Wi-Fi solutions. According to market reports, Wi-Fi usage has been constantly increasing.

SUMMARY

One embodiment is directed to a method including modifying access rights for a Wi-Fi network in response to a condition, wherein modifying the access rights for the Wi-Fi network allows users without Wi-Fi subscriptions to access the Wi-Fi network. The method may further include returning the access rights back to their prior state when the condition is no longer met.

Another embodiment may include an apparatus which may include at least one processor and at least one memory including computer program code. The at least one memory and the computer program code may be configured, with the at least one processor, to cause the apparatus at least to modify access rights for a Wi-Fi network in response to a condition, wherein modifying the access rights for the Wi-Fi network allows users without Wi-Fi subscriptions to access the Wi-Fi network, and optionally return the access rights back to their prior state when the condition is no longer met.

Another embodiment may include a computer program, embodied on a computer readable medium. The computer program may be configured to control a processor to perform a process including modifying access rights for a Wi-Fi network in response to a condition, wherein modifying the access rights for the Wi-Fi network allows users without Wi-Fi subscriptions to access the Wi-Fi network, and optionally returning the access rights back to their prior state when the condition is no longer met.

Another embodiment is directed to an apparatus including means for modifying access rights for a Wi-Fi network in response to a condition, wherein modifying the access rights for the Wi-Fi network allows users without Wi-Fi subscriptions to access the Wi-Fi network, and means for optionally returning the access rights back to their prior state when the condition is no longer met.

Another embodiment may include a method including receiving a communication to modify access rights for a Wi-Fi network in response to a condition, wherein modifying the access rights for the Wi-Fi network allows users without Wi-Fi subscriptions to access the Wi-Fi network, and receiving a communication to optionally return the access rights back to their prior state when the condition is no longer met.

Another embodiment may include an apparatus comprising at least one processor and at least one memory including computer program code. The at least one memory and the computer program code may be configured, with the at least one processor, to cause the apparatus at least to receive a communication to modify access rights for a Wi-Fi network in response to a condition, wherein modifying the access rights for the Wi-Fi network allows users without Wi-Fi subscriptions to access the Wi-Fi network, and receive a communication to optionally return the access rights back to their prior state when the condition is no longer met.

Another embodiment may include a computer program, embodied on a computer readable medium. The computer program may be configured to control a processor to perform a process including receiving a communication to modify access rights for a Wi-Fi network in response to a condition, wherein modifying the access rights for the Wi-Fi network allows users without Wi-Fi subscriptions to access the Wi-Fi network, and receiving a communication to optionally return the access rights back to their prior state when the condition is no longer met.

Another embodiment may include an apparatus including means for receiving a communication to modify access rights for a Wi-Fi network in response to a condition, wherein modifying the access rights for the Wi-Fi network allows users without Wi-Fi subscriptions to access the Wi-Fi network; and means for receiving a communication to optionally return the access rights back to their prior state when the condition is no longer met.

BRIEF DESCRIPTION OF THE DRAWINGS

For proper understanding of the invention, reference should be made to the accompanying drawings, wherein.

DETAILED DESCRIPTION

Figure 1:
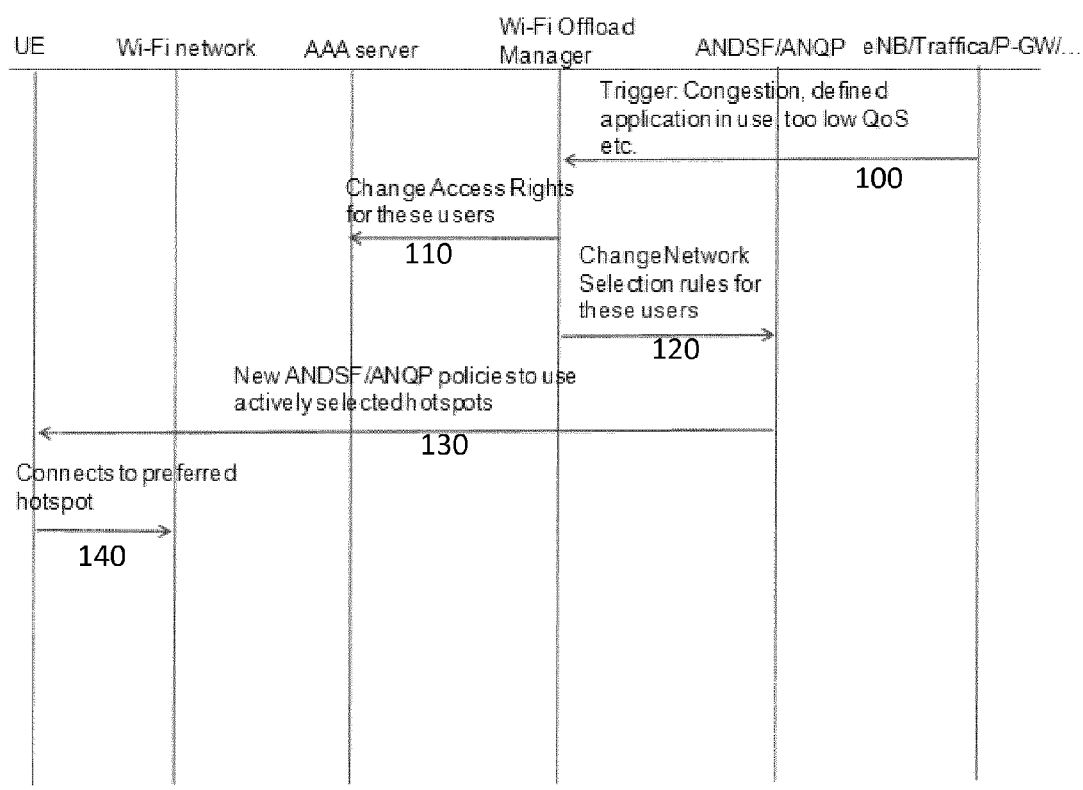
FIG. 1 illustrates the operation, according to one embodiment, of dynamic hotspot authentication and access.

It will be readily understood that the components of the invention, as generally described and illustrated in the figures herein, may be arranged and designed in a wide variety of different configurations. Thus, the following detailed description of the embodiments of a method, an apparatus, and a computer program product for dynamic hotspot authentication and access as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings, and embodiments of this invention, and not in limitation thereof.

As Wi-Fi spots become similar to cells within mobile radio access networks (by providing users access to services), operators begin to require more control over how user devices move between mobile and Wi-Fi networks. Some operators prefer to keep users within their mobile networks as much as possible. These operators prefer to start offloading traffic to nearby Wi-Fi networks after a mobile network runs out of capacity, like during cell congestion. These dynamic operations may require use of new mechanisms and technologies.

3GPP release 8 TS 23.402 describes ANDSF (Access Network Discovery and Selection Function) which provides an operator a tool to control how user devices move between mobile and Wi-Fi networks. ANDSF can be used to tell a specific user device/group of user devices to automatically connect to defined Wi-Fi networks when becoming available, thus providing an operator the tools to offload traffic to Wi-Fi and leave more resources on the mobile network to better serve mobile users. However, use of ANDSF alone by the operator may not be sufficient because, if a particular user does not have Wi-Fi access rights as part of the user's subscription, the user may not be able to be authenticated in a Wi-Fi network. Further, if a mobile network user profile (e.g. stored into home location register/home subscriber server/policy control rule function (HLR/HSS/PCRF)) denies Wi-Fi access for the user, Wi-Fi access may fail after authentication if the user traffic is integrated into a packet core and a gateway GPRS support node/packet data network gateway (GGSN/P-GW) via a gateway (GW) like tunnel termination gateway (TTG), enhanced packet data gateway (ePDG), or Access GW (MAG). In such a case, temporary allowance of Wi-Fi access in appropriate user profile(s) ensures all network elements involved in integrating Wi-Fi traffic to a packet core and GGSN/P-GW/alike operate fluently and do not reject the user.

Alternatively, an operator may configure an AAA server (by configuring an AAA server database, for example) to designate which users are able to have access to operator hotspots/defined Wi-Fi network areas. Such a configuration may take place, for example, when a user buys a data subscription with Wi-Fi access. However, at present, dynamic configuration may not be performed online on demand.

Typically, an operator bundles Wi-Fi usage, for example, to premium mobile data subscriptions for users. Users with these subscriptions may then be able to access operator hotspots. Other users may need to buy online access to operator hotspots, for example, using Captive portal (username/password inputted into a landing page) authentication.

Current hotspot authentication mechanisms do not support a strategy of efficient offloading to Wi-Fi when a mobile network, for example, begins to run out of resources because of too much traffic. One of the difficulties in efficient offloading to Wi-Fi is that, within a visibility area of a Wi-Fi network, there may only be a few premium data users with Wi-Fi hotspot access rights (subscriptions). Further, another difficulty is that most of the users with Wi-Fi capable devices may continue using the mobile network despite being able to access the Wi-Fi network. In order to be able to manage network congestion, there is a need for a tool that allows masses of users to be offloaded to a Wi-Fi network when necessary and then brought back to the mobile network later.

In view of the above, one embodiment is directed to a dynamic access rights management system for operators of Wi-Fi networks. In some embodiments, temporary access to operator Wi-Fi networks may be granted to users who do not normally have Wi-Fi access rights as part of, for example, their mobile data subscriptions. Otherwise, only users with subscriptions to a Wi-Fi network may normally access the Wi-Fi network. In some embodiments, Wi-Fi may be any wireless local area network products that are based on the Institute of Electrical and Electronics Engineers' (IEEE) 802.11 standards.

To ensure that user devices move to selected Wi-Fi networks, some embodiments may be coupled with a network selection tool, like 3GPP ANDSF (Access Network Discovery and Selection Function) or Hotspot 2.0 ANQP (Access Network Query Protocol). As such, operators are provided with an efficient tool to manage congestion situations in a mobile network and/or to improve user experience, as any number of users may be dynamically offloaded to nearby Wi-Fi networks.

Certain embodiments may select user(s) to be given temporary access rights to selected (or all) operator or operator roaming partner hotspots based on, for example:
  An amount of congestion in a mobile cell, with the aim of reducing mobile cell load.
  Factors necessary to support an adequate level of user experience, e.g. defined bitrates or quality of service (QoS).
  Congestion or shortage of network resources on any other part of the mobile network (i.e., interface or network elements like GGSN/P-GW).
  Use of defined applications by the user (detected with Deep Packet Inspection or the like), for example, use of video streaming or P2P.
  If a user has certain type of mobile subscription and, for example, exceeds monthly quota, an operator grants Wi-Fi access and encourages the user to use Wi-Fi after the quota has been exceeded.
  If a mobile network is malfunctioning or otherwise does not operate as targeted on some area, temporary access to Wi-Fi may be granted to fulfil service agreements Certain embodiments also apply to non-mobile operators, like BT. For example BT may operate Wi-Fi hotspots with different service set identifiers (SSIDs) or service domains and, if a user is granted access to only one SSID (like BTOpenZone), temporary access can be granted dynamically to another BT SSID (like BT-VIP or BT-Stadium). The temporary access management may occur, for example, during a football game when a BTOpenZone load is heavy or as an online decision where a BT subscriber enters an area (like a shopping mall) and there is a campaign involving the subscriber requiring access to BT network resources (like SSID) that are not typically part of BT user subscription.

Certain embodiments may include the following functions which may use separate network elements integrated into existing network elements. Some of the functions may be combined and some of the functions omitted.

Certain embodiments may include a Wi-Fi Offload Manager in a mobile network that decides when to trigger traffic offload to a Wi-Fi network. The Wi-Fi Offload Manager may be located close to a base station/radio access network RRM (Radio Resource Manager) or within a monitoring/analysis platform or within a packet data network gateway/deep packet inspection (P-GW/DPI) etc. As such, the Wi-Fi Offload Manager may learn when congestion, or other defined criteria, occurs in a mobile network, whether users are using certain applications (e.g. video), and when users do not receive data at a targeted bit rate, for example.

FIG. 1 illustrates a method according to certain embodiments. At 100, the Wi-Fi Offload Manager may be triggered by defined criteria and conditions. The Wi-Fi Offload Manager may trigger, for example, a sequence of actions.

For example, there may be a modification of Wi-Fi network access rights to allow a number of users or selected users to access services via the Wi-Fi network. These users with access may even include those users not normally having Wi-Fi access rights via subscription.

In one embodiment, at 110, the Offload Manager may communicate with an authentication, authorization, and accounting (AAA) server (or any entity including a Wi-Fi access rights database/profile) to indicate that access rights to a certain Wi-Fi access point or group of Wi-Fi access points (e.g. access points near a train station where mobile cell congestion occurs or all operator access points in the event of mobile network malfunction or a campaign) has changed. The AAA server may modify the Wi-Fi access authorization database to allow new users to access the Wi-Fi networks.

To simplify management of access rights, the Wi-Fi Offload Manager may indicate to the AAA server that all of an operator's own subscribers (and also possibly the subscribers of selected roaming partners) may connect to the hotspot. For example, when Extensible Authentication Protocol for GSM Subscriber Identity Module (EAP-SIM) or Extensible Authentication Protocol Method for UMTS Authentication and Key Agreement (EAP-AKA) hotspot authentication is used, the AAA server may learn an international mobile subscriber identity (IMSI) containing a Mobile Country Code and Mobile Network Code (MCC/MNC). Therefore, the AAA may be able to determine if the user belongs to a group to which access rights have been temporarily granted regardless of whether the user has Wi-Fi as part of the user's subscription. Also if an authentication method other than a (U)SIM based method is used for Wi-Fi Access, a mapping configuration may be used to indicate which user is an operator's own subscriber and which user is a roaming user, or in general which user group is allowed to access to Wi-Fi network(s). In addition, when using username/password type of authentication, there may be a realm in use revealing home operator, access profile or alike. For example Operator X user might utilize the following type of access credentials; john.smith@operatorx.com. This kind or realm may be used to identify home subscribers without using (U)SIM based authentication and the realm may also be used to differentiate different users even within home operator.

An identifier identifying the selected users having the access rights may be provided to the AAA server. An identifier may include, for example, IMSI and/or Mobile Subscriber Integrated Services Digital Network Number (MSISDN). An identifier may also be a username/password, access credential realm (like btopenzone.com), a user device MAC address, IP address, etc.

Modifying access rights to selected users may allow still using, for example, WPA2 Enterprise hotspot authentication features. For example, WPA2 Enterprise may allow securing Wi-Fi radio communication with WPA2-PSK that a user device and Wi-Fi access point enable.

As an option, a Wi-Fi Offload Manager can identify, for example, SSIDs, basic service set identifiers (BSSIDs), extended service set identifiers (ESSIDs), internet protocol (IP) addresses, location info (like GPS coordinates), and media access control (MAC) addresses related to the Wi-Fi access points to an AAA server and thus may allow the AAA server to identify to which Wi-Fi access points the new access rights apply.

In another embodiment, the Wi-Fi Offload Manager may communicate with a Wi-Fi network management system (a system that configures and monitors the Wi-Fi networks and, for example, access points) to disable access control for a certain Wi-Fi access point (or SSID) or group of Wi-Fi access points. If access control is temporarily disabled, all users may be able to connect via the Wi-Fi access point (hotspot) to services. For example if an access point normally uses 802.1x hotspot authentication for a given SSID, 802.1x may be disabled, turning the access point (and SSID) into free public hotspot type of hotspot.

In certain embodiments, at 120, the Wi-Fi Offload Manager may communicate with a network discovery/selection server (like an ANDSF or an ANQP server) to send new policies, at 130, to selected user devices to enable the user devices to connect automatically to available Wi-Fi networks when available. For example, new ANDSF policies to a user device may indicate that the user device should utilize SSID=a when available (a temporary rule may be created using ANDSF time of day and/or location policies). As a result, a user device may automatically start using Wi-Fi at 140.

Therefore, users and their user devices may be able to connect to the Wi-Fi networks due to access control being modified/disabled.

When the conditions requiring dynamic hotspot authentication and access management no longer apply (e.g. cell congestion no longer persists or QoS levels may be met), the Wi-Fi Offload Manager may cancel temporary access rights to hotspots and may optionally trigger a network discovery/selection server to change network discovery/selection policies back to normal for affected user devices.

Figure 2:
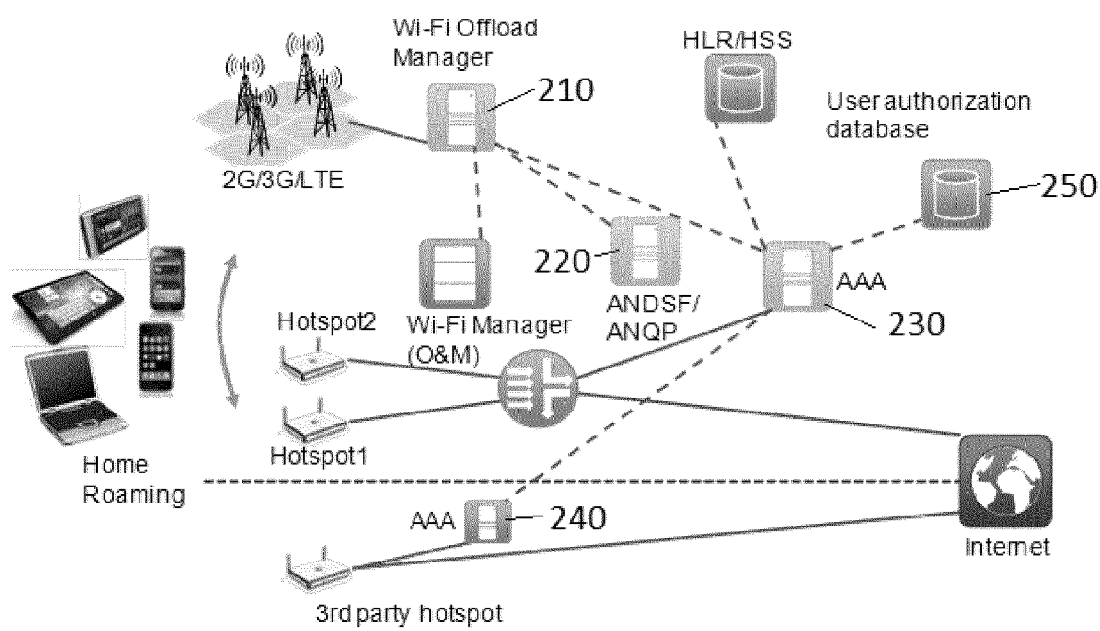
FIG. 2 illustrates, according to one embodiment, a network architecture for dynamic hotspot authentication and access.

Referring to FIG. 2, in certain embodiments, an ANDSF server 220, for example, may give conditions to network discovery/selection policies for a limited given area and date/time, resulting in automatic cancellation of changed network discovery/selection policies in user devices under later conditions.

In certain embodiments, an AAA server (230 and 240) may authenticate and authorize users to access services via Wi-Fi networks (hotspots). Users who have rights to use a given hotspot may be connected via the hotspot, other users may be blocked.

In one embodiment, a user is granted temporary credentials to access a Wi-Fi network. For example, a Wi-Fi Manager requests a Device Management server, short message service (SMS) server (or alike) to send Wi-Fi access credentials, like username/password/PIN code or other security token, to a user device. Then Wi-Fi network access rights are modified to allow using these temporary credentials for all/selected Wi-Fi networks. For example username/password may be provisioned over the air to enable EAP-PEAP (Protected EAP) authentication transparent for the user but still allowing to identify the user, for example, for lawful interception or alike purposes.

In certain embodiments, the AAA server (230 and 240) and/or authorization access right management database 250 may provide an application programming interface that allows a Wi-Fi Offload Manager 210 to trigger change of access rights for (a) some users, (b) all users, (c) selected Wi-Fi access points (hotspots), e.g. points near a train station, (d) and/or all operator hotspots in a given geographical area, for example.

After changing the access rights, AAA server (230 and 240) may be able to utilize the new authentication and authorization policies as a part of hotspot authentication.

AAA server (230 and 240) may keep temporary access rights valid until otherwise told (e.g. by Wi-Fi Offload Manager 210) or after a predefined time (e.g. 30 minutes). The predefined time may also be determined by Wi-Fi Offload Manager 210), for example.

In certain embodiments, ANDSF server 220 that provides network discovery and selection policies to user devices may be used to ensure user devices find and connect automatically to nearby hotspots of which the users have access rights. In case temporary access right credentials are given to the user (like temporarily valid username/password/PIN code), this may be included into ANDSF messaging with the user device or configured separately, for example, by using Device Management based mechanisms.

For example, ANDSF server 220 may define operator hotspots and their selection rules for users who have subscriptions to Wi-Fi service of the operator. As such, devices may proactively use Wi-Fi when available. ANDSF server 220 can, for example, define:

- A priority list for different networks. For example, ANDSF server 220 may tell a user device to automatically use an operator hotspot with SSID=A when available. If the operator hotspot with SSID=A is not available, then the user device may be told to use a roaming partner hotspot with SSID=B. If the roaming hotspot with SSID=B is not available, then the user device may be told to use a mobile network.
- Details for network selection such as, for example, time-of-day or location-based criteria. This may enable, for example, the offloading of traffic to a hotspot with SSID=A near a train station (and during a busy hour).

Thus, when access rights affecting certain user(s) are changed for a hotspot, a network discovery/selection tool may ensure that selected user devices start utilizing the hotspots automatically.

In one embodiment, a new SSID (SSID=c) may be created to a Wi-Fi AP when condition, like cell congestion, occurs. Network discovery and/or selection rules for the new SSID (SSID=c) may be configured to user devices beforehand or when a condition occurs, for example by using ANDSF or Device Management. Then Wi-Fi Offload Manager may trigger Wi-Fi access rights management for the new SSID=c to allow only selected users or all users to access the new SSID. As a result, for example when mobile cell congestion occurs near train station, new SSID may be created to train station APs allowing selected/all users in train station to connect to the Wi-Fi network.

Figure 3:
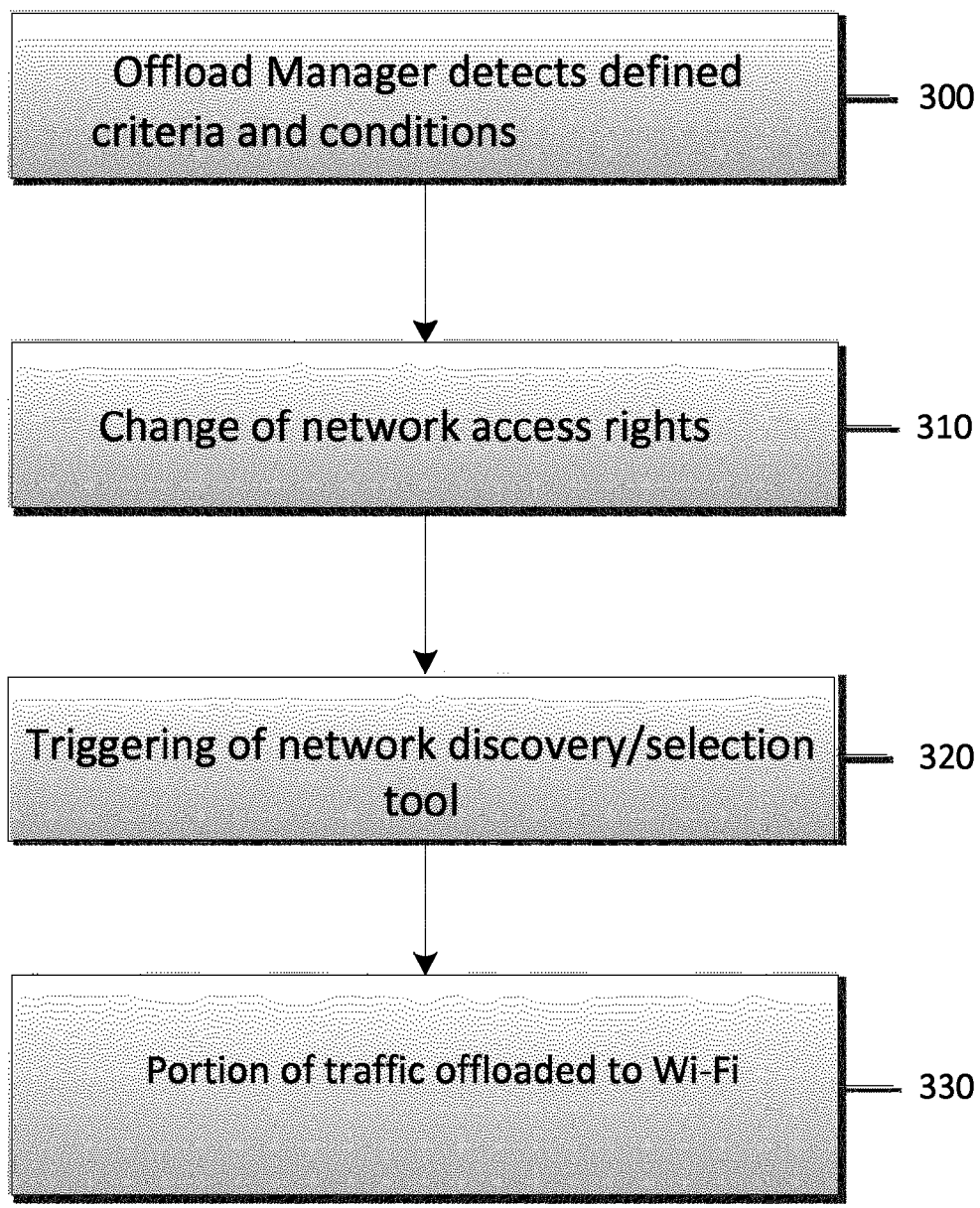
FIG. 3 illustrates a flow diagram of a method according to one embodiment.

Referring to FIG. 3, certain embodiments of the invention may operate as follows:

- At 300, a Wi-Fi Offload Manager detects congestion on a 3G network around a train station during a busy hour in the afternoon.
- At 310, the Wi-Fi Offload Manager triggers an access rights management change affecting Wi-Fi hotspots near the train station. The Wi-Fi Offload Manager may tell an AAA server to allow all of an operator's own subscribers (with MCC/MNC or with defined access credential realm like @operator.com) to access selected hotspots. The AAA server learns the hotspot locations during authentication, e.g. based on IP address, MAC address, physical connection information (like L2 connection), Virtual LAN identifiers (VLAN), or location information (like GPS coordinates) or alike.
- At 320, the Wi-Fi Offload Manager triggers a network discovery/selection tool to configure new network selection policies to user devices or all compatible user devices in the area to ensure that these user devices start offloading traffic to train-station hotspots
- As a result, at 330, a portion of traffic is offloaded to Wi-Fi, including subscribers who typically do not have access rights to Wi-Fi service. Such offloading improves the user experience for an operator's subscribers and leaves more resources on the mobile network.
- As an option, the operator may integrate Wi-Fi access with a packet core network so as to be able to perform charging and policy control with offloaded traffic from the packet core network. In such a case, a user profile in HLR/HSS/PCRF/alike may need to be changed to allow Wi-Fi access and service.
- As an option, the operator may apply services like Lawful Interception, Policy Control, Charging, Deep Packet Inspection etc. to Wi-Fi traffic even if not integrating the traffic to packet core network. In such a case, a user profile in BRAS/BNG/PCRF/alike may need to be changed to allow Wi-Fi access and service.

Figure 4:
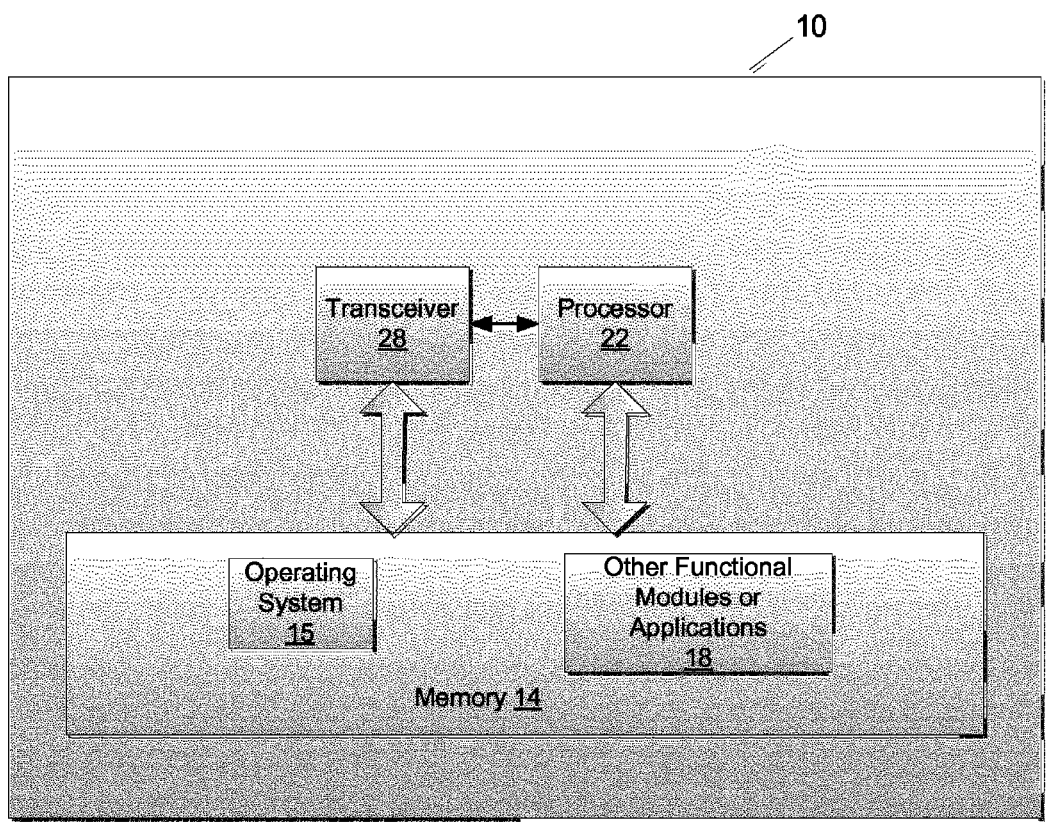
FIG. 4 illustrates an apparatus according to one embodiment.

FIG. 4 illustrates an apparatus 10 according to another embodiment. In an embodiment, apparatus 10 may be an Offload Manager. In other embodiments, apparatus 10 may be a device receiving communication from an Offload Manager.

Apparatus 10 includes a processor 22 for processing information and executing instructions or operations. Processor 22 may be any type of general or specific purpose processor. While a single processor 22 is shown in FIG. 4, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 may further include a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

As mentioned above, according to one embodiment, apparatus 10 may be an Offload Manager. In this embodiment, apparatus 10 may be controlled by memory 14 and processor 22 to modify access rights for a Wi-Fi network in response to a condition. In this example, modifying the access rights for the Wi-Fi network allows users of a mobile network to access the Wi-Fi network. Apparatus 10 may then be further controlled by memory 14 and processor 22 to return the access rights back to their prior state when the condition is no longer met.

According to another embodiment, apparatus 10 may be a device receiving communication from an Offload Manager. In this embodiment, apparatus 10 may be controlled by memory 14 and processor 22 to receive a communication to modify access rights for a Wi-Fi network in response to a condition. In this example, modifying the access rights for the Wi-Fi network allows users of a mobile network to access the Wi-Fi network. Apparatus 10 may then be further controlled by memory 14 and processor 22 to receive a communication to return the access rights back to their prior state when the condition is no longer met.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A method, comprising:
    modifying access rights for a Wi-Fi network in response to a congestion condition, wherein modifying the access rights for the Wi-Fi network allows at least one user without a relevant authorizing Wi-Fi subscription to access the Wi-Fi network to enable traffic between the at least one user and a mobile network to be offloaded to the Wi-Fi network; and
    returning the access rights back to their prior state when the condition is no longer met.

2. The method according to claim 1, wherein the condition is cell congestion within a mobile network.

3. The method according to claim 1, wherein at least one user of the users without Wi-Fi subscriptions is a user of a mobile network.

4. The method according to claim 1, further comprising communicating with a server to enable users to automatically connect with the Wi-Fi network.

5. An apparatus, comprising:
    at least one processor; and
    at least one memory including computer program code,
    the at least one memory and the computer program code configured, with the at least one processor, to cause the apparatus at least to
    modify access rights for a Wi-Fi network in response to a congestion condition, wherein modifying the access rights for the Wi-Fi network allows at least one user without a relevant authorizing Wi-Fi subscription to access the Wi-Fi network to enable traffic between the at least one user and a mobile network to be offloaded to the Wi-Fi network;
    return the access rights back to their prior state when the condition is no longer met.

6. The apparatus according to claim 5, wherein the condition is cell congestion within a mobile network.

7. The apparatus according to claim 5, wherein at least one user of the users without Wi-Fi subscriptions is a user of a mobile network.

8. The apparatus according to claim 5, wherein the apparatus further communicates with a server to enable users to automatically connect with the Wi-Fi network.

9. A computer program, embodied on a non-transitory computer readable medium, the computer program configured to control a processor to perform a process, comprising:
    modifying access rights for a Wi-Fi network in response to a congestion condition, wherein modifying the access rights for the Wi-Fi network allows at least one user without a relevant authorizing Wi-Fi subscription to access the Wi-Fi network to enable traffic between the at least one user and a mobile network to be offloaded to the Wi-Fi network; and
    returning the access rights back to their prior state when the condition is no longer met.

10. A method, comprising:
    receiving a communication to modify access rights for a Wi-Fi network in response to a congestion condition, wherein modifying the access rights for the Wi-Fi network allows at least one user without a relevant authorizing Wi-Fi subscription to access the Wi-Fi network to enable traffic between the at least one user and a mobile network to be offloaded to the Wi-Fi network; and
    receiving a communication to return the access rights back to their prior state when the condition is no longer met.

11. The method according to claim 10, wherein the condition is cell congestion within a mobile network.

12. The method according to claim 10, wherein at least one user of the users without Wi-Fi subscriptions is a user of a mobile network.

13. An apparatus, comprising:
    at least one processor; and
    at least one memory including computer program code,
    the at least one memory and the computer program code configured, with the at least one processor, to cause the apparatus at least to
    receive a communication to modify access rights for a Wi-Fi network in response to a congestion condition, wherein modifying the access rights for the Wi-Fi network allows at least one user without a relevant authorizing Wi-Fi subscription to access the Wi-Fi network to enable traffic between the at least one user and a mobile network to be offloaded to the Wi-Fi network; and
    receive a communication to return the access rights back to their prior state when the condition is no longer met.

14. The apparatus according to claim 13, wherein the condition is cell congestion within a mobile network.

15. The apparatus according to claim 13, wherein at least one user of the users without Wi-Fi subscriptions is a user of a mobile network.

16. A computer program, embodied on a non-transitory computer readable medium, the computer program configured to control a processor to perform a process, comprising:

receiving a communication to modify access rights for a Wi-Fi network in response to a congestion condition, wherein modifying the access rights for the Wi-Fi network allows at least one user without a relevant authorizing Wi-Fi subscription to access the Wi-Fi network to enable traffic between the at least one user and a mobile network to be offloaded to the Wi-Fi network; and receiving a communication to return the access rights back to their prior state when the condition is no longer met.

17. The computer program according to claim 16, wherein the condition is cell congestion within a mobile network.

18. The method according to claim 1, wherein temporary access is provided for a specified area where traffic load is heavy.

19. The method according to claim 10, wherein temporary access is provided for a specified area where traffic load is heavy.

\* \* \* \* \*